US012801775B2

(12) United States Patent
Xu et al.

(10) Patent No.: US 12,801,775 B2
(45) Date of Patent: Nov. 17, 2026

(54) METHOD AND SYSTEM FOR TRUSTED THIRD PARTY AUDIT OF PERSONAL-INFORMATION DELETION

(71) Applicant: HUAZHONG UNIVERSITY OF SCIENCE AND TECHNOLOGY, Wuhan (CN)

(72) Inventors: Peng Xu, Wuhan (CN); Yixin Su, Wuhan (CN); Wei Wang, Wuhan (CN); Mengyang Yu, Wuhan (CN); Tianyang Chen, Wuhan (CN); Hai Jin, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 305 days.

(21) Appl. No.: 18/602,957

(22) Filed: Mar. 12, 2024

(65) Prior Publication Data

US 2024/0330505 A1 Oct. 3, 2024

(51) Int. Cl.
*G06F 21/62* (2013.01)

(52) U.S. Cl.
CPC ...... *G06F 21/6245* (2013.01); *G06F 21/6254* (2013.01); *G06F 2221/2143* (2013.01)

(58) Field of Classification Search
CPC ......... G06F 21/6245; G06F 2221/2143; G06F 21/6254; G06F 21/6263; G06F 21/6272
See application file for complete search history.

(56) References Cited

U.S. PATENT DOCUMENTS

2008/0168567 A1* 7/2008 Hahn .................. G06F 21/6245 726/28
2010/0299430 A1* 11/2010 Powers ............... H04L 63/1416 709/224
2013/0297346 A1* 11/2013 Kulkarni ............. G06F 21/6245 705/3

(Continued)

FOREIGN PATENT DOCUMENTS

CN 106095575 11/2016
CN 107818150 3/2018
CN 115408229 11/2022

*Primary Examiner* — Joseph L Greene
(74) *Attorney, Agent, or Firm* — Michael Ye; Kalos Athena Wang PLLC

(57) ABSTRACT

A method and system for trusted third-party audit of personal-information deletion is provided, wherein the method includes: acquiring log data of an arbitrary source-domain personal-information deleting body in a network and of its associated-domain personal-information deleting bodies; normalizing the log data according to predetermined parsing rules and thereby generating normalized log data; and performing consistency-of-notification analysis and operation-compliance analysis on the normalized log data by means of association analysis. The present application is based on an audit analysis of log files to identify whether the information deletion process conforms to the multi-dimensional or multi-level audit judgment conditions and to perform forensics on abnormal deletion of personal information in a timely manner, so as to ensure that personal-information deletion can satisfy requirements of internal control, industrial standards, policies and regulations.

4 Claims, 2 Drawing Sheets

(56) References Cited

U.S. PATENT DOCUMENTS

| | | | | |
|---|---|---|---|---|
| 2017/0270315 | A1* | 9/2017 | Kuo | G06Q 50/265 |
| 2023/0090611 | A1* | 3/2023 | Ciampaglia | G06F 21/6245<br>726/27 |

* cited by examiner

METHOD AND SYSTEM FOR TRUSTED THIRD PARTY AUDIT OF PERSONAL-INFORMATION DELETION

This application claims priority to Chinese Patent Application No. CN 202310322357.0 filed on Mar. 29, 2023, which is hereby incorporated by reference as if fully set forth herein.

BACKGROUND OF THE APPLICATION

Field

The present disclosure generally relates to information technology, computer technology, network technology and internet technology. More particularly, the present disclosure relates to auditing method and information protection. Specifically, the present disclosure relates to a method and system for trusted third-party audit of personal-information deletion.

Description of Related Art

As use of personal information becomes increasingly extensive and regulations related thereto becomes increasingly strict, personal-information deletion has now been a common practice. Also, frequently reported data-breaching cases are also the reason why users pay more and more attention to information deletion as a method to protect personal data. While most internet-based service providers always undertake to fully delete personal information of their users as soon as the information is no more needed, the existing measures they adopt for data deletion are not all reliable, making it necessary for users to verify secure deletion of their personal information.

In order to better monitor and secure proper operation of a deletion-responsible body in a personal information domain, to timely detect abnormalities and internal breaches of the deletion-responsible body, to perform ex post facto analysis for security incidents, and to provide information for investigative and forensic purposes, trusted third-party audit is employed as a remedy for reliable personal-information deletion. In China, the national laws, regulations and industrial standards have incorporated requirements for log auditing. This makes log auditing an indispensable part for enterprises to satisfy compliance and internal control. Methods for auditing personal-information deletion includes manual audit and automatic audit. Manual audit is usually conducted by professionals through time-consuming complicated steps, making it costly, yet is incapable of auditing deletion in associated domains. Automatic audit, according to conventional practice, is merely about checking whether notification of deletion is issued as required and has no solution to ensure consist notification and compliant operation.

Some technical schemes have been disclosed for improving audit in terms of efficiency and quality. For example, China Patent Publication No. CN106095575B discloses a device, system and method for log audit. The device for log audit is connected to at least two external device and is for receiving, when idling, log files sent by the at least two external devices through every collecting process of a collecting unit; determining normalization rules through every normalized process of a normalizing unit, analyzing, when idling, attributes of the log files, and determining association attributes of the log files according to the normalization rules and the attributes of the log files; through every associating process of a log associating unit, determining association rules and alarm rules, upon receipt of the association attributes, associating logs according to the association rules, and when the log association satisfies the alarm rules, triggering an alarm unit; and through the alarm unit, raising a log audit alarm. The known technical scheme purports to improve audit efficiency by optimizing log audit processes through steps of collection, normalization, association and alarm. However, it fails to address the review of log contents and determination of log compliance.

China Patent Publication No. CN107818150B discloses a log auditing method and a device thereof, for standardizing initial logs of various components in large data platforms with different sources and formats by parsing the original logs collected from various large data platform components, mapping fields in a standardized manner, and dividing operation types and operation details of the logs; and then, according to the auditing requirement of the big data security management and control, adopting corresponding auditing rules and analysis strategies to automatically audit and analyze the standardized logs of each component in the big data platform so as to determine whether the management and data access operation of the big data platform and the components meet the security technical specification and the management requirement.

China Patent Publication No. CN115408229A discloses an operation log auditing method, device, electronic equipment and a storage medium thereof, wherein the method comprises the following steps: acquiring an operation log of the account to be audited; and inputting the operation log of the account to be audited into a log auditing model to obtain an auditing result of the account to be audited, which is output by the log auditing model. The log audit model is obtained by training based on basic operation characteristics and abnormal operation characteristics of sample accounts in each sample account category and audit labels of the sample accounts. The sample account category is determined based on the basic operation characteristics of a plurality of sample accounts. The audit tag of each sample account is determined based on a preset tag of each sample account among the sample accounts. The known technical scheme implements standardization as preparation of audit, and audits the logs using the trained auditing model based on predetermined audit rules and analysis strategies.

According to the above description, it is clear that none of the known technical schemes for auditing system operation states and behavior information of a data platforms based on log files or data provides reliable third-party audit based on analysis and determination of operation logs and results of personal-information deletion at a responsible body. In other words, none of these known schemes is capable of effectively monitoring personal-information deletion at a data platform or system, providing effective analysis means for and supportive proof of abnormal operation and internal breach of a deletion-responsible body, ensuring full personal-information deletion of interest at a data platform after expiration of related authorization, and thereby performing supervision of information use and examination of privacy protection based on the process of third-party audit of deletion of logs against a data platform or system.

Since there is certainly discrepancy between the existing art comprehended by the applicant of this patent application and that known by the patent examiners and since there are many details and disclosures disclosed in literatures and patent documents that have been referred by the applicant during creation of the present disclosure not exhaustively recited here, it is to be noted that the present disclosure shall actually include technical features of all of these existing works, and the applicant reserves the right to supplement the application with the related art more existing technical features as support according to relevant regulations.

SUMMARY

In view of the shortcomings of the existing art, the present disclosure provides a method for trusted third-party audit of personal-information deletion. The method includes: acquiring log data of an arbitrary source-domain personal-information deleting body in a network and of its associated-domain personal-information deleting bodies; normalizing the log data according to predetermined parsing rules and thereby generating normalized log data; and performing consistency-of-notification analysis and operation-compliance analysis on the normalized log data by means of association analysis.

In the present disclosure, the contents of the log data are main contents of log data, such as information content, information states, etc., such as notification-of-deletion logs, notification-of-deletion confirmation logs, operation-of-deletion logs, and result-of-deletion self-assessment logs. Tag data of log data are security-related verification data of log data, such as signatures, secret keys, identification codes, etc. For example, tag data of log data may be log data signatures, so that the log collecting module receives the content data of the log data after the log data signature has passed verification.

The present application provides a method and system for trusted third-party audit of personal-information deletion, which helps address the shortcomings or defects of the existing solutions for trusted third-party audit of personal-information deletion. The disclosed method and system obtain third-party-audit-of-deletion logs that represent audit result by acquiring, normalizing, associating and analyzing log data from a source-domain personal-information deleting body and its associated-domain personal-information deleting bodies. From the third-party-audit-of-deletion logs, based on association analysis, the personal-information deletion behavior related to abnormal audit results can be identified. According to this, through forensically tracing back the original log data and files, by means of examination of the log file that carries the information of personal-information deletion, it is possible to have accurate and comprehensive knowledge of whether collection, use and deletion of the information of interest conform to rules related to information security and privacy protection, and to timely correct abnormality and/or internal breach, thereby ensuring that management of a data platform or system and its data access conform to security-related technical specifications and management requirements and satisfy requirements of internal control, industrial standards, policies and regulations.

Particularly, as to information security and privacy protection, a log file records information about statuses and destinations of information during collection, use and deletion. The disclosed method and system can automatically acquire logs, associate and analyze logs, and output log audit results. Normalization according to parsing rules helps significantly improve analysis efficiency and obtain specific data information. Association analysis herein may be realized by performing association analysis on content data and tag data of a log file, respectively, so as to obtain a multi-dimension multi-layer association analysis result, which can then be used to achieve efficient processing of the massive log file and to identify abnormal deletion behavior, thereby performing forensic trace-back and in turn providing efficient audit and supportive proof for analyzing and correcting abnormal personal-information deletion behavior and internal breach.

Therefore, the present disclosure is applicable to originations like governments, internet companies, auditing firms, etc. A government or an auditing firm may use the technical scheme of the present disclosure to audit personal-information deletion executed by an agent responsible for dealing with personal information of interest, and determine whether the personal information of interest has been properly deleted according to corresponding laws and/or regulations. An internet company may use the technical scheme of the present disclosure to examine whether all the copies of personal information of interest have been deleted across its multiple business systems and whether the deletion operation satisfies corresponding laws and/or regulations. The present disclosure provides an efficient and secure method for auditing personal-information deletion. It can automatically audit personal-information deletion, and can effectively ensure full deletion of data of interest and compliance of deletion operation. As compared with the existing art, the technical scheme of the present disclosure has many advantages. The first is automation because the automatic auditing function of the disclosed method effectively reduces costs otherwise required by and mistakes otherwise caused by manual operation. The second is security because the disclosed method ensures integrity of personal-information deletion logs and verifies the identity of information senders. The third is usability because the disclosed method can be easily integrated into existing data management systems without additional costs for labor and resources.

Preferably, in the step of acquiring the log data of the source-domain personal-information deleting body and the log data of the associated-domain personal-information deleting bodies, the log data include content data and tag data, and the content data are received after the tag data have passed verification, wherein the content data include notification-of-deletion logs, notification-of-deletion confirmation logs, operation-of-deletion logs, and result-of-deletion self-assessment logs.

Preferably, the step of acquiring the log data of the source-domain personal-information deleting body and the log data of the associated-domain personal-information deleting bodies comprises: actively sending a log-data-collecting request to the source-domain personal-information deleting body in the network and obtaining request confirmation information, and/or receiving log data regularly pushed by the source-domain personal-information deleting body in the network and returning push confirmation information; according to the log data of the source-domain personal-information deleting body, locating the corresponding associated domain and sending log data collecting request to the corresponding associated-domain personal-information deleting bodies and obtaining request confirmation information.

Preferably, the step of receiving the content data after the tag data have passed the verification comprises: having the source-domain personal-information deleting body and its associated-domain personal-information deleting bodies generate tag data, and having the auditing body receive the tag data sent by the source-domain personal-information deleting body and its associated-domain personal-information deleting bodies and perform the verification. For example, when the tag data are log data signatures, the source-domain personal-information deleting body and its associated-domain personal-information deleting bodies sign the log data, and the auditing body receives the log data signatures from the source-domain personal-information deleting body and its associated-domain personal-information deleting bodies so as to perform the verification.

Preferably, the step of having the source-domain personal-information deleting body and its associated-domain personal-information deleting bodies generate tag data includes: having the source-domain personal-information deleting body and its associated-domain personal-information deleting bodies add timestamps to the content data of the log data to compose log data messages, and using the corresponding private key to figure out the tag data of the log data message. The step of having the auditing body receive the tag data sent by the source-domain personal-information deleting body and its associated-domain personal-information deleting bodies and perform the verification includes: verifying communication time of the log data messages so as to select the log data message whose communication time is below a preset time value, and performing public key computation and verification for the tag data.

Preferably, the step of normalizing the log data according to the predetermined parsing rules and generating the normalized log data includes: merging log information by filtering out useless fields from logs, extracting information of key fields from the log data, and reconstructing the information into corresponding normalized logs using a matching normalization format.

Preferably, the step of performing the consistency-of-notification analysis on the normalized log data by means of the association analysis includes: analyzing entries in the normalized notification-of-deletion logs of the source-domain personal-information deleting body entry by entry and defining the entry analyzed currently as a first entry; according to the key fields in the first entry, identifying a corresponding second entry in the normalized notification-of-deletion confirmation logs of the associated-domain personal-information deleting bodies; and obtaining a consistency-of-notification-audit-analysis result according to a correspondence-of-existence result and a correspondence-of-content result between the first entry and the second entry.

Preferably, the correspondence-of-existence result indicates whether a said corresponding second entry can be identified according to the key fields in the first entry; and the correspondence-of-content result indicates whether the first entry and the second entry are correspondent with each other in terms of target, granularity and method related to deletion of the personal information.

Preferably, the step of performing the operation-compliance analysis on the normalized log data by means of the association analysis comprises: analyzing entries in the normalized operation-of-deletion logs of the source-domain personal-information deleting body and the associated-domain personal-information deleting bodies entry by entry and defining the entry analyzed currently as the first entry; according to the key fields in the first entry, identifying the corresponding second entry in the normalized result-of-deletion self-assessment logs of the same domain; and generating an operation-compliance-audit-analysis result according to the correspondence-of-existence result and the compliance-of-content result between the first entry and the second entry.

Preferably, the correspondence-of-existence result indicates whether the corresponding second entry in the normalized result-of-deletion self-assessment logs can be identified according to the key fields in the first entry in the normalized operation-of-deletion logs; and the compliance-of-content result indicates whether a consistency-of-deletion-request assessment result, a consistency-of-deletion-operation assessment result, a deletion-operation-effectiveness assessment result, and a deletion-irrevocability assessment result in the second entry in the normalized result-of-deletion self-assessment logs are compliant.

Preferably, the method further comprises: after completing the association analysis of the normalized log data, generating third-party-audit-of-deletion logs; and based on the third-party-audit-of-deletion logs, identifying the log data related to abnormality of deletion for retrospective forensics of the original log data.

Preferably, the step of, based on the third-party-audit-of-deletion logs, identifying the log data related to abnormality of deletion for retrospective forensics of the original log data includes: acquiring the consistency-of-notification result and the operation-compliance-audit-analysis result related to the abnormal deletion, locating the entry having the related log data and providing a forensic analysis result.

The present application further provides a system for trusted third-party audits of personal-information deletion. The system at least comprises: a log collecting module, for acquiring log data of an arbitrary source-domain personal-information deleting body in a network and of its associated-domain personal-information deleting bodies; and a log analyzing module, for normalizing the log data according to predetermined parsing rules and generating normalized log data, and performing consistency-of-notification analysis and operation-compliance analysis on the normalized log data by means of association analysis.

DETAILED DESCRIPTION

The present disclosure will be further detailed below with reference to accompanying drawings and particular embodiments.

In the present disclosure, personal information refers to information that is electronically or otherwise recorded and when referred alone or in conjunction with other information can identify a certain natural person or reflect activities of a certain natural person, including the name, the ID no., the contact details, the address, the account/password, the property status, and location tracking of the natural person. Audit refers to an independent, economy-related supervising activity about ex ante and ex post examination on major projects and financial balance of governments of different levels and financial institutions, enterprises, business organizations conducted by a special agency according to laws. Third-party audit refers to a process where a special agency conducts audit under commission. Log data are massive log information generated during operation of general computer software/hardware like network devices, servers, applications, etc. and various specific business systems. The log information reflects operation status of relevant computer software/hardware and business systems. Audit of logs is an important measure to understand operation status. Currently, in some enterprises, log audit for big data platforms is conducted by in-house security management personnel by regularly checking original log information from nodes of service components. Other enterprises may use big data management platforms to check a part of logs to manually review and audit these logs, thereby ensuring that management of a data platform or system and its data access conform to security-related technical specifications and management requirements and satisfy requirements of internal control, industrial standards, policies and regulations.

Particularly, as to information security and privacy protection, a log file records information about statuses and destinations of information during collection, use and deletion. Thus, from the auditing process of a log file, it is possible to accurately and comprehensively know whether collection, use and deletion of information conform to regulations about information security and privacy protection and to timely correct abnormality and/or internal breach. However, the existing systems are devoid of trusted third-party audit. To ensure secure deletion of personal information and realize supervision on personal-information deletion, the present disclosure provides an audit method and a system thereof, particularly a log audit method and a system thereof, and particularly a method and system for trusted third-party audit of personal-information deletion, which are hereinafter referred to as the method and the system, respectively.

Figure 1:
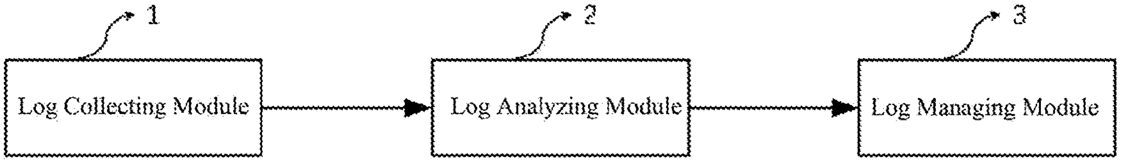
FIG. 1 is a structural diagram of a system according to one embodiment of the present disclosure.

As shown in FIG. 1, the system of the present disclosure comprises a log collecting module 1, a log analyzing module 2, and a log managing module 3. The system further comprises an auditing filter for storing parsing rules and an auditing body for performing audit. The log collecting module 1 may use a network adapter to connect itself to a network, and communicate with personal information network adapters through network protocols, thereby acquiring various log data. The log analyzing module 2 may use a CPU to process log data. Where massive log data are involved or complicated analysis are required, a GPU, an FPGA or an ASIC may be alternatively employed for this purpose. The log managing module 3 may use a USB flash drive to store data. In this case, the system of the present disclosure may be constructed from hardware such as network adapters, CPUs, and or USB flash drives. At the front end of the system, the data source hardware may be a network adapter, or may be interface in various forms to be connected to other devices for data transmission. At the back end of the system, the data destination may be built-in hardware for data storage, or may be hardware in various forms for storage located at a cloud storage platform or a remote host.

Specifically, the log collecting module 1 is for acquiring notification-of-deletion logs, notification-of-deletion confirmation logs, operation-of-deletion logs, result-of-deletion self-assessment logs, and signatures of log data of source-domain personal-information deleting body and its associated-domain personal-information deleting bodies. After the signature is verified, the relevant log data are received. A source-domain personal-information deleting body is a main body data platform or system that manages personal information, and each of its associated-domain personal-information deleting bodies is another data platform or system that has relation in terms of collection, use, sharing and backing up of personal information with the source-domain personal-information deleting body. Notification of deletion may be generated by a source-domain personal-information deleting body and sent to its associated-domain personal-information deleting bodies, thereby forming notification-of-deletion logs. The associated-domain personal-information deleting bodies receive the notification of deletion, and feed notification-of-deletion confirmation back to the source-domain personal-information deleting body, thereby forming notification-of-deletion confirmation logs. The source-domain personal-information deleting body and/or its associated-domain personal-information deleting bodies execute deletion, thereby forming operation-of-deletion logs. The source-domain personal-information deleting body and/or its associated-domain personal-information deleting bodies evaluate their own deletion performance, thereby forming result-of-deletion self-assessment logs. The log analyzing module 2 is for parsing logs, associating and analyzing logs, and generating third-party-audit-of-deletion logs. Parsing logs is about normalizing log files from all deletion-responsible bodies against a standard simplified format through procedural operation steps. Associating and analyzing logs comprises establishing association among log files based on log contents and log tags, and generating third-party-audit-of-deletion logs based on association and analysis results. The log managing module 3 may perform sample-based audit and forensic analysis on logs, and may further provide alarms against various risks and manage various logs.

Figure 2:
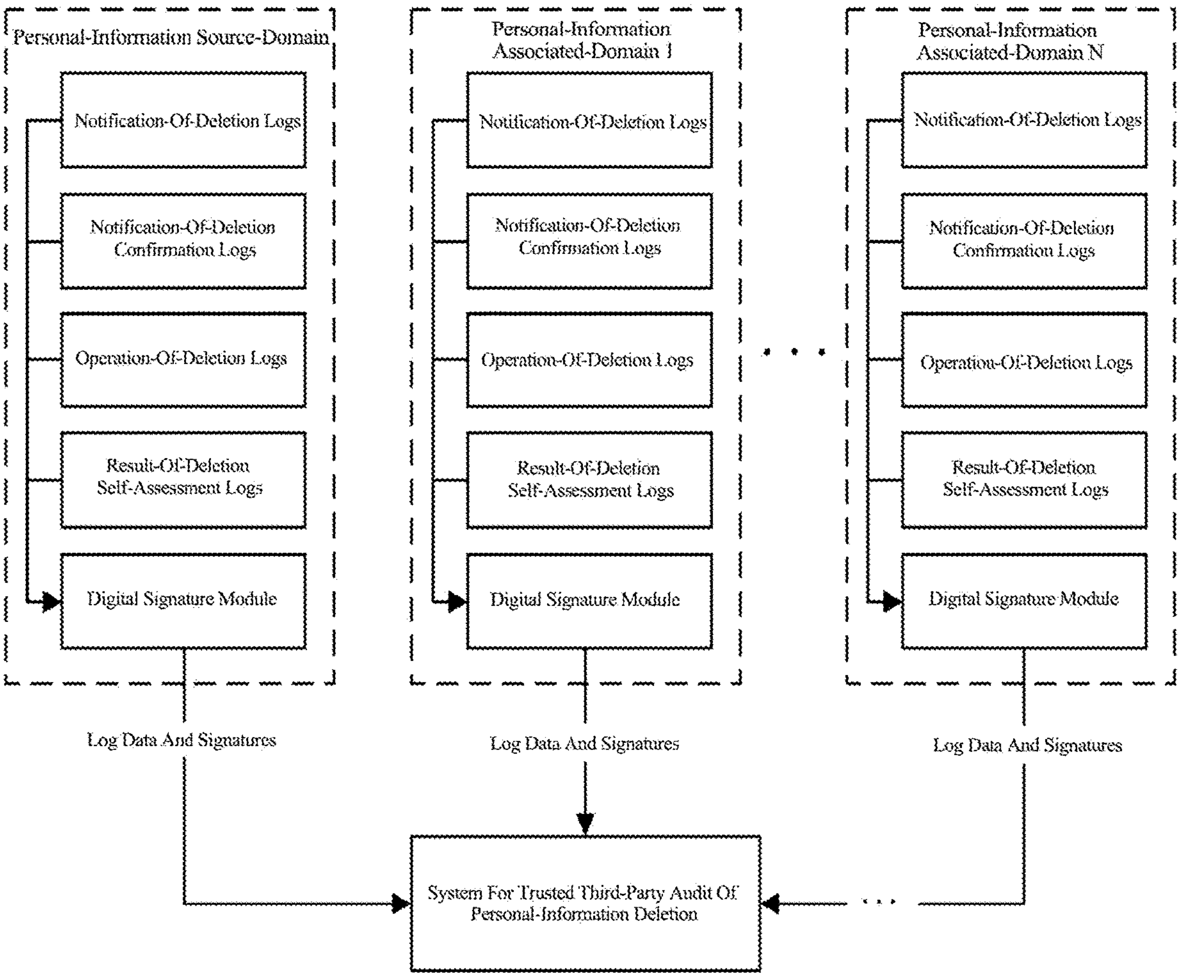
FIG. 2 is a flowchart of log collection in the method and the system according to one embodiment of the present disclosure.
Figure 3:
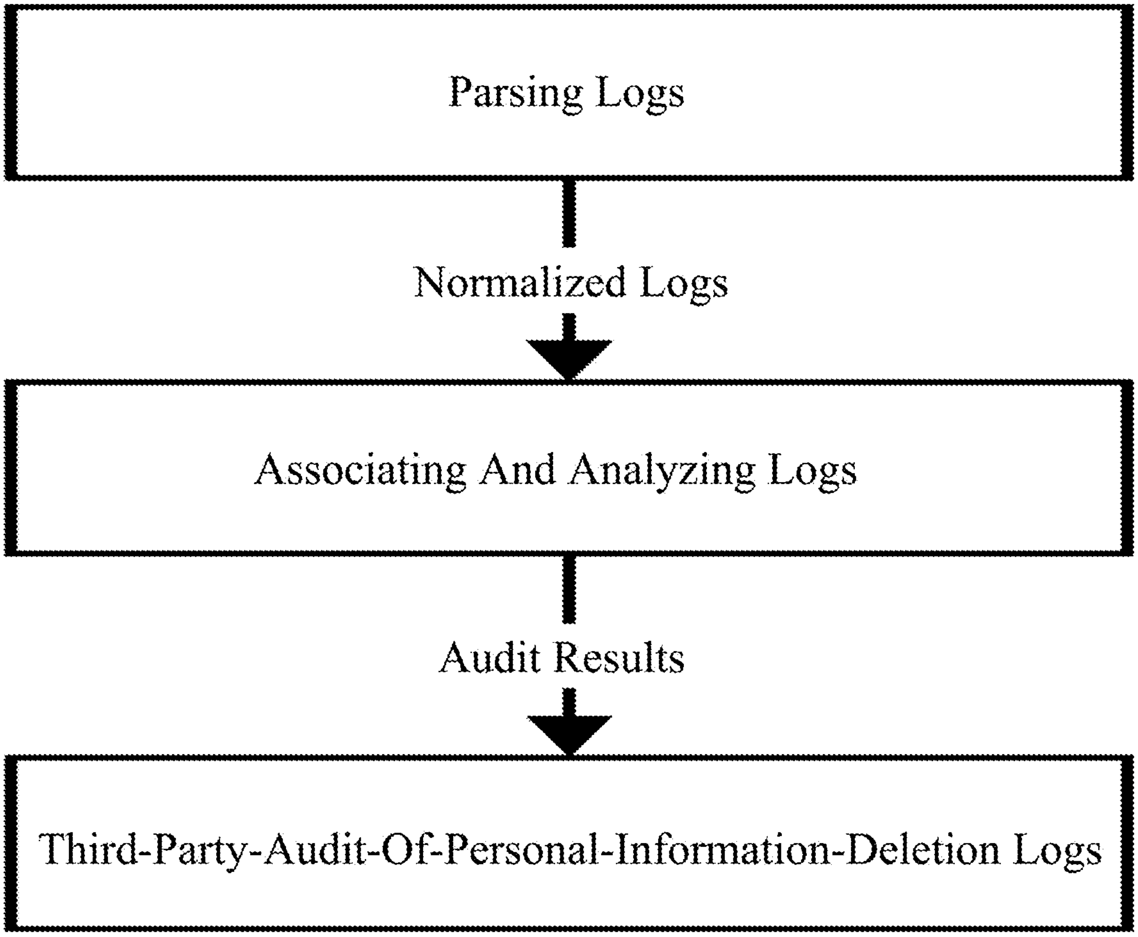
FIG. 3 is a flowchart of log analysis in the method and the system according to one embodiment of the present disclosure.

As shown in FIG. 2 and FIG. 3, the method of the present disclosure is about auditing information-deletion-responsible bodies such as data platforms or systems based on third-party audit. This is achieved by supervising and reviewing operation data and operation result statuses of deletion-responsible bodies, generating third-party-audit-of-deletion logs based on operation data and operation result statuses of deletion-responsible bodies, and storing them after computing the corresponding digital signatures, so as to implement comprehensive audit about consistency of notification and operation compliance related to personal-information deletion, and to perpetuate and manage abnormal logs generated during personal-information deletion. The method further supports sample-based audit on logs, which generates audit results promptly and efficiently; supports forensic analysis on logs, which locates problems quickly to facilitate following up according to various abnormal log data; and supports timely warning against various risks and incidents by means of real-time alarms in forms of emails, text messages, and acoustic alarms.

In the disclosed method, the audit subject may be any source-domain personal-information deleting body and its associated-domain personal-information deleting bodies in the network. The deletion-responsible body may be a device, software, or an individual. For example, the source-domain personal-information deleting body may be a smart terminal, and its associated-domain personal-information deleting bodies may include various authorized network platforms or APPs, so that associative relation in terms of collection, use, sharing and backing up of personal information exists between the source-domain personal-information deleting body and its associated-domain personal-information deleting bodies As such, the personal information source domain and its associated domains form a closed system that contains all existence of the personal information. The personal information may be transferred and operated within the closed system in a controlled manner. Such a system can adjust its scope by incorporating additional or deleting some existing associated-domain personal-information deleting bodies, so as to adjust the use scope of the personal information and assign permission to use the personal information.

To ensure effective supervision on collection, use and deletion of personal information, the disclosed method implements audit by analyzing and processing log files of different data platforms. This comprises: acquiring log data of an arbitrary source-domain personal-information deleting body in a network and of its associated-domain personal-information deleting bodies, wherein the log data include content data and tag data, and the content data can be received after the tag data have passed verification; and normalizing the log data according to predetermined parsing rules to generate normalized log data. Consistency-of-notification analysis and operation-compliance analysis are performed on the normalized log data by means of association analysis. For personal-information deletion behavior having abnormal audit result, all the related original logs are stored. The results are gathered to form third-party-audit-of-deletion logs which will be stored then after computing the corresponding digital signatures. Therein, based on the third-party-audit-of-deletion logs, the log data related to abnormality of deletion are identified for retrospective forensics of the original log data. The content data are main contents of the log data, including information contents, information statuses, etc. The tag data are security verification data of the log data, such as signatures, secret keys, identification codes, etc. For example, the tag data of the log data are log data signatures, so the log collecting module 1 receives the content data of the log data after the log data signatures have passed verification.

Preferably, as shown in FIG. 2, the step of acquiring log data of an arbitrary source-domain personal-information deleting body in a network and of its associated-domain personal-information deleting bodies comprises: acquiring notification-of-deletion logs, notification-of-deletion confirmation logs, operation-of-deletion logs, result-of-deletion self-assessment logs, and log data signatures of any source-domain personal-information deleting body and its associated-domain personal-information deleting bodies in the network, and receiving the log data after the signatures have passed verification.

Preferably, the step of acquiring notification-of-deletion logs, notification-of-deletion confirmation logs, operation-of-deletion logs, result-of-deletion self-assessment logs, and log data signatures of any source-domain personal-information deleting body and its associated-domain personal-information deleting bodies in the network comprises: actively sending a collection request for collecting the notification-of-deletion logs, notification-of-deletion confirmation logs, operation-of-deletion logs, result-of-deletion self-assessment logs, and log data signatures to the source-domain personal-information deleting body in the network and obtaining request confirmation information; and/or receiving notification-of-deletion logs, notification-of-deletion confirmation logs, operation-of-deletion logs, result-of-deletion self-assessment logs, and log data signatures regularly pushed by the source-domain personal-information deleting body in the network and returning push confirmation information; identifying corresponding associated domains according to the notification-of-deletion logs of the source-domain personal-information deleting body, and sending collection requests for collecting notification-of-deletion logs, notification-of-deletion confirmation logs, operation-of-deletion logs, result-of-deletion self-assessment logs, and log data signatures to corresponding associated-domain personal-information deleting bodies and obtaining request confirmation information.

Preferably, the source-domain personal-information deleting body and its associated-domain personal-information deleting bodies generate log data signatures and the auditing body perform verification on the log data signatures. In other words, the source-domain personal-information deleting body and its associated-domain personal-information deleting bodies sign the log data, and the auditing body receives the log data signatures from the source-domain personal-information deleting body and its associated-domain personal-information deleting bodies and performs the verification.

Preferably, the process where the source-domain personal-information deleting body and its associated-domain personal-information deleting bodies sign the log data using a digital signing module is achieved as below. The source-domain personal-information deleting body and its associated-domain personal-information deleting bodies add timestamps to the notification-of-deletion logs, notification-of-deletion confirmation logs, operation-of-deletion logs, and result-of-deletion self-assessment logs and combine them into a message. Then a corresponding private key is used to compute the signature of this very message. This is particularly achieved as below. The deletion-responsible bodies first combine the notification-of-deletion logs $Log_n$, notification-of-deletion confirmation logs $Log_c$, operation-of-deletion logs Logo, result-of-deletion self-assessment logs $Log_s$, and timestamp $T_i$ into a message $m_i=(Log_n \| Log_c \| Log_o \| Log_s \| T_i)$, where $\|$ represents message concatenation. Then Hash operation is performed on the message $m_i$ to obtain an information abstract, and the corresponding private key $sk_i$ is used to compute the signature value of.

Preferably, the auditing body receives the log data signatures from the source-domain personal-information deleting body and its associated-domain personal-information deleting bodies and performs the verification through: after receiving the log data message $m_i$ and the signature $\sigma_i$ from the source-domain personal-information deleting body, first plugging the current time T into the equation $T-T_i$, and if the result is not greater than the maximum allowable communication time $\tau$, determining that this message is a fresh message and resuming verifying the signatures, or, otherwise, returning message expiry information and discarding the message. For verifying the signatures, the corresponding public key $PK_i$ is used to verify the signature value $\sigma_i$. If the verification succeeds, "1" is output and the signature is accepted. Otherwise, "0" is output and the signature is rejected.

As shown in FIG. 3, the step of normalizing the log data according to the predetermined parsing rules and generating normalized log data comprises: merging log information by filtering out useless fields from logs, extracting information of key fields from the log data, and reconstructing the information into corresponding normalized logs using a matching normalization format. Once the signatures have passed the verification, designated uniform parsing rules are used to parse notification-of-deletion logs, notification-of-deletion confirmation logs, operation-of-deletion logs, and result-of-deletion self-assessment log data of arbitrary formats. The process where various logs are normalized according to the parsing rules in the auditing filter is achieved by: filtering useless fields from the logs, and merging log information; extracting key field information from the notification-of-deletion logs, notification-of-deletion confirmation logs, operation-of-deletion logs, and result-of-deletion self-assessment log data, respectively, and reformatting the information into corresponding normalized logs using the corresponding normalized format. The useless fields maybe sentence contents having auxiliary functions and helping understand the logs, while the key field information is for recording user operation, tracing execution, and collecting data of operational environments.

Preferably, the fields of the normalized notification-of-deletion log, namely the fields after normalization of the notification-of-deletion logs, at least include: notification-of-deletion marks, source-domain personal-information deleting body marks, notification-of-deletion associated-domain personal-information deleting body marks, deletion target data marks, deletion granularity, deletion method, notification-of-deletion dates, and notification-of-deletion time. The fields in the normalized notification-of-deletion confirmation log, namely the fields after normalization of the notification-of-deletion confirmation logs, at least include: notification-of-deletion confirmation marks, associated-domain personal-information deleting body marks, notification-of-deletion source domain deletion-responsible body marks, notification-of-deletion receipt marks, deletion target data marks, deletion granularity, deletion method, notification-of-deletion confirmation dates, and notification-of-deletion confirmation time. The fields in the normalized operation-of-deletion log, namely the fields after normalization of the operation-of-deletion logs, at least include: operation-of-deletion marks, personal information domain deletion-responsible body marks, notification-of-deletion confirmation marks, deletion target data marks, deletion granularity, deletion method, operation-of-deletion dates, and operation-of-deletion time. The fields in the normalized result-of-deletion self-assessment log, namely the fields after normalization of the result-of-deletion self-assessment log, at least include: result-of-deletion self-assessment marks, personal information domain deletion-responsible body marks, operation-of-deletion marks, consistency-of-deletion-request assessment results, consistency-of-deletion-operation assessment results, deletion-operation-effectiveness assessment results, deletion-irrevocability assessment results, result-of-deletion self-assessment dates, and result-of-deletion self-assessment time.

As shown in FIG. 3, the step of performing the consistency-of-notification analysis and operation-compliance analysis on the normalized log data by means of the association analysis comprises: once the original logs are parsed into normalized logs, associating the normalized notification-of-deletion logs, the normalized notification-of-deletion confirmation logs, the normalized operation-of-deletion logs, and the normalized result-of-deletion self-assessment logs, and performing audit analysis of consistency-of-notification and operation-compliance related to personal-information deletion according to the corresponding fields, so as to obtain the corresponding audit analysis results.

Preferably, the step of performing the consistency-of-notification analysis on the normalized log data by means of the association analysis includes: analyzing entries in the normalized notification-of-deletion logs of the source-domain personal-information deleting body entry by entry and defining the entry analyzed currently as a first entry; according to the key fields in the first entry, identifying a corresponding second entry in the normalized notification-of-deletion confirmation logs of the associated-domain personal-information deleting bodies; obtaining a consistency-of-notification-audit-analysis result according to a correspondence-of-existence result and a correspondence-of-content result between the first entry and the second entry. The correspondence-of-existence result indicates whether a said corresponding second entry can be identified according to the key fields in the first entry; and the correspondence-of-content result indicates whether the first entry and the second entry are correspondents with each other in terms of target, granularity and method related to deletion of the personal information. Specifically, this involves performing audit analysis on entries in the normalized notification-of-deletion logs of the source-domain personal-information deleting body entry by entry, and when performing audit analysis on any of the entries, according to the key fields in the first entry, identifying a corresponding second entry in the normalized notification-of-deletion confirmation logs of the associated-domain. Specifically, according to the contents of mark fields of the associated-domain personal-information deleting bodies in the first entry, the notification-of-deletion confirmation logs in the corresponding associated domains are identified. Then according to the contents of the notification-of-deletion mark fields in the first entry, a second entry having the same contents in the notification-of-deletion mark fields is identified. If there is not such a second entry found in the associated domains, it is determined that the result of consistency-of-notification audit analysis is abnormal, and abnormality information is returned. Afterward, it is to analyze whether the first entry and the second entry are correspondent with each other in terms of target, granularity and method related to deletion of the personal information. If so, it is determined that the first entry achieves consistency of notification related to personal-information deletion. Otherwise, it indicates that the first entry has an abnormal result in the consistency-of-notification audit analysis, and abnormality information is returned.

Preferably, the step of performing the operation-compliance analysis on the normalized log data by means of the association analysis comprises: analyzing entries in the normalized operation-of-deletion logs of the source-domain personal-information deleting body and the associated-domain personal-information deleting bodies entry by entry and defining the entry analyzed currently as the first entry; according to the key fields in the first entry, identifying the corresponding second entry in the normalized result-of-deletion self-assessment logs of the same domain; and generating an operation-compliance-audit-analysis result according to the correspondence-of-existence result and the compliance-of-content result between the first entry and the second entry. The correspondence-of-existence result indicates whether the corresponding second entry can be identified according to the key fields in the first entry; and the compliance-of-content result indicates whether a consistency-of-deletion-request assessment result, a consistency-of-deletion-operation assessment result, a deletion-operation-effectiveness assessment result, and a deletion-irrevocability assessment result in the second entry are compliant. Specifically, this is about performing audit analysis on every entry in the operation-of-deletion logs of the personal information source domain and its associated-domain personal-information deleting bodies entry by entry; and for performing audit analysis on any of the entries, according to the key fields of the first entry, identifying a corresponding second entry in the result-of-deletion self-assessment logs in the same domain. Specifically, this is about, according to the contents of the first operation-of-deletion mark fields in the first entry, identifying a second entry having the same contents in its (second) operation-of-deletion mark fields. If there is not such a second entry found in the same domain, it is determined that the result of operation compliance audit analysis is abnormal, and abnormality information is returned. Then analysis is performed to determine whether the consistency-of-deletion-request assessment result, the consistency-of-deletion-operation assessment result, the deletion-operation-effectiveness assessment result, and the deletion-irrevocability assessment result in the second entry satisfy relevant specifications or regulations. If so, it is determined that the first entry achieves operation compliance related to personal-information deletion. Otherwise, it indicates that the first entry has an abnormal result in the operation compliance audit analysis, and abnormality information is returned.

Preferably, after the association analysis of the normalized log data is completed, the results are gathered to generate third-party-audit-of-deletion logs and stored after the corresponding digital signatures are computed. For personal-information deletion behavior related to abnormal results in the audit, all the related original logs are stored. Preferably, the process for computing a digital signature for a third-party-audit-of-deletion log $Log_a$ is about: combining third-party audit log generation time T to generate a message $m=(Log_a \| T) \in \{0,1\}^*$, performing Hash operation on the message m so as to obtain an information abstract, and using the private key sk of the auditing body to compute the signature σ. Specifically, when any of the bodies verifies the message m, it first plugs the last third-party audit time t in the message into the equation T−t. If the resulting value is not greater than the maximum allowable signature time τ, it is determined that this message is a fresh message. Otherwise, signature expiry information is returned. The public key PK of the auditing body is given to verify whether the signature is true. If so, "1" is output and this signature is accepted. Otherwise, "0" is output and this signature is rejected.

Preferably, the generated third-party-audit-of-deletion logs key fields at least include: third-party audit marks, personal information domain deletion-responsible body marks, notification-of-deletion marks, consistency-of-notification audit analysis result, operation-of-deletion marks, operation compliance audit analysis result, third-party audit dates, and third-party audit time.

Specifically, the step of, based on the third-party-audit-of-deletion logs, identifying the log data related to abnormality of deletion for retrospective forensics of the original log data comprises: acquiring the consistency-of-notification result and the operation compliance audit analysis result related to the abnormal deletion, locating the entry having the related log data and providing a forensic analysis result. As shown in FIG. 2 and FIG. 3, for log forensic analysis, all original logs related to abnormal results in personal-information deletion behavior audit are identified, and reasons of the abnormal results are determined according to predetermined rules, so as to accurately locate the problematic log entries. For example, if one entry in the normalized notification-of-deletion log of the source-domain personal-information deleting body indicates an abnormal result of the consistency-of-notification audit, the auditing body extracts this first entry, and finds out a second entry corresponding thereto in the notification-of-deletion confirmation log of the associated domain, so as to analyze and determine whether the target, granularity and method for personal-information deletion in the first entry are identical to those in the contents of the second entry, and give detailed reasons of abnormality.

Preferably, the disclosed method may further include, based on forensic analysis results of personal-information deletion behavior having abnormal audit results, giving notification and alarms about certain risk categories or risk incidents related to personal-information deletion behavior according to predetermined rules. The predetermined rules may be frequency thresholds, probability thresholds or other types of custom criteria. To warn for various risks and incidents, according to predetermined rules of the system, a real-time alarm is given in the form of notification in a predetermined way after a certain kind of risks and/or incidents have happened for a predetermined number of times. Specifically, in the event of an abnormal audit result of an entry in the notification-of-deletion log of a source-domain personal-information deleting body, an email is sent to the relevant email address. If there are five entries having abnormality, a text message will be sent to the registered mobile phone number. When ten abnormal entries appear, the system gives an acoustic alarm.

Preferably, in order to enhance log auditing in terms of efficiency and quality, the disclosed method may include sampling the logs for audit and performing forensic analysis on the target log to obtain proof that proves compliant use of personal information or customer information. This is achieved by randomly selecting a certain proportion of entries from log data of a source-domain personal-information deleting body and from log data of its associated-domain personal-information deleting bodies, performing analysis for consistency of notification and operation compliance related to personal-information deletion, and obtaining audit analysis results. When the audit analysis results satisfy a frequency threshold, a probability threshold, or another type of custom criteria, it is determined that the source-domain personal-information deleting body and its associated-domain personal-information deleting bodies achieve consistency of notification and operation compliance.

For example, log sampling audit is performed by randomly selecting a certain proportion of entries in the notification-of-deletion log of the source-domain personal-information deleting body, and performing analysis for consistency-of-notification audit on these entries. If all these entries achieve consistency of notification, it is probable that the source-domain personal-information deleting body achieves consistency of notification. This further includes randomly selecting a certain proportion of entries in the operation-of-deletion logs of the personal information source domain and its associated-domain personal-information deleting bodies, and performing analysis for operation compliance audit on these entries. If all these entries achieve operation compliance, it is probable that the personal information domain deletion-responsible body achieves operation compliance. Specifically, for a target log having r entries, x entries are sampled for audit, where $r, x \in Z^*$ and $x \leq r$. x different random numbers $j_1, j_2 \ldots j_x$ are randomly selected, where $1 \leq j_i \leq r$ and $1 \leq i \leq x$. The random numbers $j_1, j_2 \ldots j_x$ are positions of the sampled entries.

Specifically, if one entry in the normalized notification-of-deletion log of the source-domain personal-information deleting body indicates an abnormal result of the consistency-of-notification audit, the auditing body extracts this first entry, and finds out a second entry corresponding thereto in the notification-of-deletion confirmation log of the associated domain, so as to analyze and determine whether the target, granularity and method for personal-information deletion in the first entry are identical to those in the contents of the second entry, and give detailed reasons of abnormality.

Preferably, to warn for various risks and incidents, according to predetermined rules of the system, a real-time alarm is given in the form of notification in a predetermined way after a certain kind of risks and/or incidents have happened for a predetermined number of times.

It is to be noted that the particular embodiments described previously are exemplary. People skilled in the art, with inspiration from the disclosure of the present disclosure, would be able to devise various solutions, and all these solutions shall be regarded as a part of the disclosure and protected by the present disclosure. Further, people skilled in the art would appreciate that the descriptions and accompanying drawings provided herein are illustrative and form no limitation to any of the appended claims. The scope of the present disclosure is defined by the appended claims and equivalents thereof.

What is claimed is:

1. A method for trusted third-party audit of personal-information deletion, the method comprising the steps of:

(a) receiving instructions designating a particular source-domain and associated-domains;

(b) acquiring original log data from the source-domain and, wherein the original log data includes content data and tag data, wherein the content data includes notification-of-deletion logs, notification-of-deletion confirmation logs, operation-of-deletion logs, and result-of-deletion self-assessment logs and wherein the content data is received after the tag data has passed verification;

(c) normalizing the original log data according to predetermined parsing rules, wherein the normalizing step comprises the steps of (i) merging log data by filtering out useless fields from the original log data;

(ii) extracting information on key fields from the merged log data; and (iii) reconstructing the merged log data into normalized log data using a matching normalization format based on the extracted information on key fields;

(d) performing consistency and compliance analysis on the normalized log data, wherein the consistency and compliance analysis comprises the steps of:

(i) analyzing an entry in the normalized notification-of-deletion logs;

(ii) according to information on key fields in the entry in the normalized notification-of-deletion logs, identifying a corresponding entry in the normalized notification-of-deletion confirmation logs and determining whether the content of the entry in the normalized notification-of-deletion logs and the content of the corresponding entry in the normalized notification-of-deletion confirmation logs are correspondent with each other in terms of target, granularity and method related to deletion of the personal information, and generating a content analysis result;

(iii) according to information on key fields in the entry in the normalized notification-of-deletion logs, identifying a corresponding entry in the normalized result-of-deletion self-assessment logs, and generating a compliance analysis result; and (iv) repeating steps (i)-(iii) for each entry in the normalized notification-of-deletion logs and producing an audit result; and (e) performing a forensic analysis on the audit result and generate alarms based on risk determinations relating to the consistency and compliance requirements.

2. The method of claim 1, further comprising the steps of: generating third-party-audit-of-deletion logs; and based on the third-party-audit-of-deletion logs, identifying the original log data related to abnormality of deletion for retrospective forensics.

3. A system for trusted third-party audit of personal-information deletion, the system comprising:

a network adapter and a CPU configured to perform:

(a) receiving instructions designating a particular source-domain and associated-domains;

(b) acquiring original log data from the source-domain and associated-domains, wherein the original log data includes content data and tag data, wherein the content data includes notification-of-deletion logs, notification-of-deletion confirmation logs, operation-of-deletion logs, and result-of-deletion self-assessment logs and wherein the content data is received after the tag data has passed verification;

(c) normalizing the original log data according to predetermined parsing rules, wherein the normalizing step comprises the steps of (i) merging log data by filtering out useless fields from the original log data;

(ii) extracting information on key fields from the merged log data; and (iii) reconstructing the merged log data into normalized log data using a matching normalization format based on the extracted information on key fields;

(d) performing consistency and compliance analysis on the normalized log data, wherein the consistency and compliance analysis comprises the steps of:

(i) analyzing an entry in the normalized notification-of-deletion logs;

(ii) according to information on key fields in the entry in the normalized notification-of-deletion logs, identifying a corresponding entry in the normalized notification-of-deletion confirmation logs and determining whether the content of the entry in the normalized notification-of-deletion logs and the content of the corresponding entry in the normalized notification-of-deletion confirmation logs are correspondent with each other in terms of target, granularity and method related to deletion of the personal information, and generating a content analysis result;

(iii) according to information on key fields in the entry in the normalized notification-of-deletion logs, identifying a corresponding entry in the normalized result-of-deletion self-assessment logs, and generating a compliance analysis result; and (iv) repeating steps (i)-(iii) for each entry in the normalized notification-of-deletion logs and producing an audit result; and (e) performing a forensic analysis on the audit result and generate alarms based on risk determinations relating to the consistency and compliance requirements.

4. The system of claim 3, wherein the system is further configured to, generating third-party-audit-of-deletion logs and, based on the third-party-audit-of-deletion logs, identifying the original log data related to abnormality of deletion for retrospective forensics.

* * * * *